US011416507B2

(12) United States Patent
Conradi et al.

(10) Patent No.: US 11,416,507 B2
(45) Date of Patent: Aug. 16, 2022

(54) INTEGRATION OF TIMESERIES DATA AND TIME DEPENDENT SEMANTIC DATA

(71) Applicant: SAP SE, Walldorf (DE)

(72) Inventors: Christian Conradi, Walldorf (DE); Seshatalpasai Madala, Bangalore (IN)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 17/080,350

(22) Filed: Oct. 26, 2020

(65) Prior Publication Data

US 2022/0129456 A1    Apr. 28, 2022

(51) Int. Cl.
*G06F 16/2458* (2019.01)
*G06F 16/248* (2019.01)

(52) U.S. Cl.
CPC ........ *G06F 16/2474* (2019.01); *G06F 16/248* (2019.01)

(58) Field of Classification Search
CPC .......................... G06F 16/2474; G06F 16/248
See application file for complete search history.

(56) References Cited

U.S. PATENT DOCUMENTS

| | | | | |
|---|---|---|---|---|
| 9,619,548 B2* | 4/2017 | Shastry | ................. | G06F 16/283 |
| 10,579,932 B1* | 3/2020 | Cantrell | ............ | G06F 16/24568 |
| 10,963,459 B2* | 3/2021 | Schmidt | ............... | G06F 21/6218 |
| 2007/0041615 A1* | 2/2007 | Chan | ...................... | G06V 20/52 |
| | | | | 382/107 |
| 2010/0318526 A1* | 12/2010 | Nakazawa | .............. | G06F 40/30 |
| | | | | 707/769 |
| 2014/0143248 A1* | 5/2014 | Gembalzyk | ........... | G06F 16/248 |
| | | | | 707/737 |
| 2018/0373753 A1* | 12/2018 | Flaks | .................... | G06F 16/245 |
| 2019/0095518 A1* | 3/2019 | Park | ........................ | H04L 67/32 |
| 2020/0258120 A1* | 8/2020 | Ardulov | ................... | G06N 3/08 |
| 2022/0027379 A1* | 1/2022 | Unterbrunner | ..... | G06F 16/2477 |
| 2022/0058166 A1* | 2/2022 | Bhatia | ................. | G06F 16/2282 |

* cited by examiner

*Primary Examiner* — Jorge A Casanova
(74) *Attorney, Agent, or Firm* — Klarquist Sparkman, LLP

(57) ABSTRACT

Techniques for processing combinations of timeseries data and time-dependent semantic data are provided. The timeseries data can be data from one or more Internet of things (IOT) devices having one or more hardware sensors. The semantic data can be master data. Disclosed techniques allow for time dependent semantic data to be used with the timeseries data, so that semantic data appropriate for a time period associated with the timeseries data can be used. Changes to semantic data are tracked and recorded, where the changes can represent a new value to be used going forward in time or an update to a value for a prior time period. Timeseries data and semantic data can be stored with identifiers that facilitate their combination, such as date ranges, identifiers of analog world objects, or identifiers for discrete sets of semantic data values.

20 Claims, 11 Drawing Sheets

FIG. 4

Table 410:

| DIM_ID | ThingID | Valid_FROM | Valid_TO | Attribute A | Attribute B |
|---|---|---|---|---|---|
| D1 | T1 | 1.1.21 | 2.2.21 | BP1 | Loc1 |
| D2 | T1 | 3.1.21 | 4.4.21 | BP1 | Loc2 |
| D3 | T1 | 5.4.21 | 6.6.21 | BP2 | Loc3 |
| D4 | T1 | 7.6.21 | 31.12.21 | BP2 | Loc4 |
| D5 | T2 | 5.4.21 | 8.8.21 | BP1 | Loc1 |
| D6 | T2 | 9.8.21 | 31.12.21 | BP1 | Loc2 |

Columns: 414a, 414b, 414c, 414d, 414e, 414f; 418a, 418, 418, 418b

Table 430:

| ThingID | DIM_ID | From | To | Min | Max | SUM |
|---|---|---|---|---|---|---|
| T1 | D1 | 31.1.21 | 31.1.21 | 1 | 4 | 24 |
| T1 | D1 | 1.2.21 | 1.2.21 | 0 | 20 | 23 |
| T1 | D1 | 2.2.21 | 2.2.21 | 1 | 11 | 29 |
| T1 | D2 | 3.2.21 | 3.2.21 | 0 | 2 | 17 |
| T1 | D2 | 4.1.21 | 4.1.21 | 3 | 5 | 19 |
| T1 | D3 | 4.4.21 | 4.4.21 | 1 | 4 | 14 |
| T1 | D3 | 5.4.21 | 5.4.21 | 0 | 5 | 27 |
| T1 | D3 | 6.4.21 | 6.4.21 | 1 | 3 | 15 |
| T2 | D5 | 7.4.21 | 7.4.21 | 1 | 3 | 16 |
| T2 | D5 | 1.1.21 | 1.1.21 | 2 | 4 | 32 |
| T2 | D5 | 2.1.21 | 2.1.21 | 1 | 2 | 25 |
| T2 | D5 | 5.6.21 | 5.6.21 | 1 | 4 | 26 |
| T2 | D6 | 8.8.21 | 8.8.21 | 2 | 3 | 16 |
| T2 | D6 | 9.8.21 | 9.8.21 | 0 | 2 | 14 |
| T2 | D6 | 10.8.21 | 10.8.21 | 1 | 4 | 23 |

Columns: 434a, 434b, 434c, 434d, 434e, 434f, 434g; markers 438

450: SELECT SUM, Attribute B where Attribute A=BP1 and Date=3.4.21 to 21.8.21

460: SELECT SUM, Attribute B where Date=3.4.21 to 21.8.21

INTEGRATION OF TIMESERIES DATA AND TIME DEPENDENT SEMANTIC DATA

FIELD

The present disclosure generally relates to techniques for processing temporal data, such as timeseries data from devices having one or more hardware sensors. In a particular example, data from such devices is combined with semantic data appropriate for a relevant time period, where at least a portion of the semantic data can change over time.

BACKGROUND

As computing devices become smaller and more powerful, increasing amounts of data can be become available for analysis. For example, sensors (which can be incorporated into smaller devices that are in turn paired with larger devices) that are connected to a network, either wirelessly or via a wired connection, are increasingly being incorporated into devices or environments. These interconnected devices can be referred to as the Internet of Things (IOT).

The amount of data produced by IOT devices can be massive. For this and other reasons, timeseries data from IOT devices is often, at least initially, provided with little semantic data. Additional issues can arise with semantic data can change over time. Accordingly, room for improvement exists in dealing with IOT data, including associating IOT data with semantic information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for processing combinations of timeseries data and time-dependent semantic data are provided. The timeseries data can be data from one or more Internet of things (IOT) devices having one or more hardware sensors. The semantic data can be master data. Disclosed techniques allow for time dependent semantic data to be used with the timeseries data, so that semantic data appropriate for a time period associated with the timeseries data can be used. Changes to semantic data are tracked and recorded, where the changes can represent a new value to be used going forward in time or an update to a value for a prior time period. Timeseries data and semantic data can be stored with identifiers that facilitate their combination, such as date ranges, identifiers of analog world objects, or identifiers for discrete sets of semantic data values.

In one aspect, a method is provided for integrating temporal data (timeseries data) and time dependent semantic data (such as one or more master data attributes that can change over time). A first definition of temporal data to be retrieved from a database is received along with a second definition of one or more semantic data elements to be used in processing the temporal data. The definition can be, for example, provided in a model of a query or view. A first change to a first semantic data element of the one or more semantic data elements is received. The first change to the first semantic data element is stored, where the storing includes storing a first value of the first semantic data element and information defining a first temporal range (e.g., a time period) for which the first value should be used.

A query is received. The query includes a second temporal range (or time period). It is determined that the second temporal range includes the first temporal range (the second temporal range overlaps all or part of the first temporal range). The query is processed using the first value, based on determining that the second temporal range includes the first temporal range. Query results are provided in response to the receiving the query, where the query results include aggregated temporal data (e.g., one or more aggregate values calculated from the temporal data).

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 is a diagram illustrating examples of a timeseries data table and a dimension table having the schemas of the corresponding tables of FIG. 2.

DETAILED DESCRIPTION

Example 1—Overview

Figure 1:
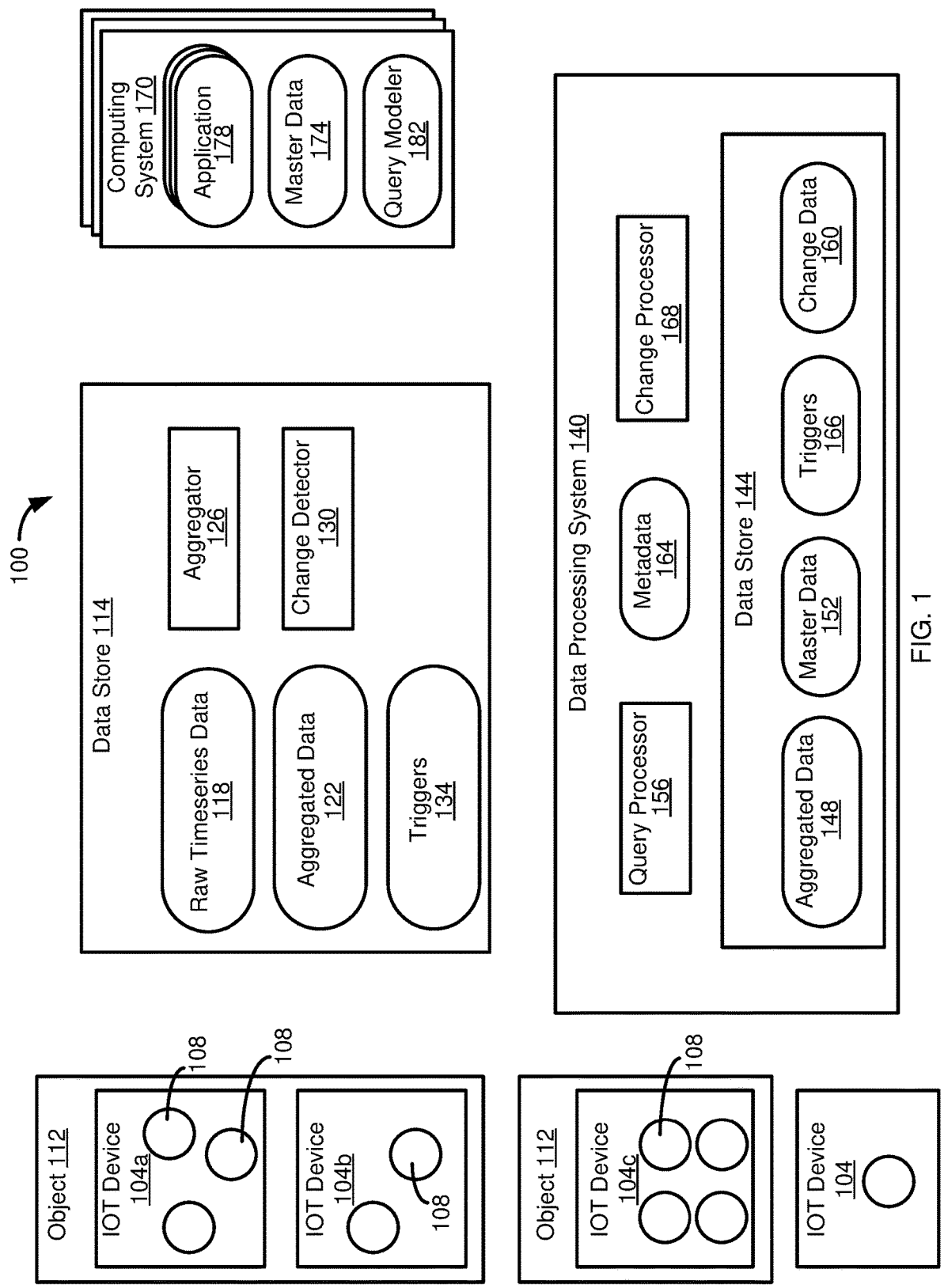
FIG. 1 is a diagram of a computing environment in which disclosed technologies can be implemented, where the computing environment facilitates the integration of timeseries data with time dependent semantic data, such as master data.

As computing devices become smaller and more powerful, increasing amounts of data can be become available for analysis. For example, sensors (which can be incorporated into smaller devices that are in turn paired with larger devices) that are connected to a network, either wirelessly or via a wired connection, are increasingly being incorporated into devices or environments. These interconnected devices can be referred to as the Internet of Things (IOT).

The amount of data produced by IOT devices can be massive. For this and other reasons, timeseries data from IOT devices is often, at least initially, provided with little semantic data. Additional issues can arise with semantic data can change over time. Accordingly, room for improvement exists in dealing with IOT data, including associating IOT data with semantic information.

Semantic information is often provided in the form of master data. Master data refers to relatively static information that provides context for other data, such as transactional data or data from IOT devices. Master data is typically associated with multiple instances of other types of data, such as transactional data or data from IOT devices. For example, many readings from IOT devices may relate to a particular piece of equipment, which can be described by a number of master data attributes (e.g., owner, supplier, location, date put into service, model number). Master data can be, or can play a role similar to, dimensions in OLAP contexts (e.g., in tables represented as a star or snowflake schema, with a fact table and one or more dimension tables). Dimensions are used to describe facts. Master data is typically used to provide information for a business as a whole, and is typically used across a business. Therefore, keeping a common set of master data (i.e., a single source of truth) can be important.

Although master data, or other types of semantic or contextual data that might be used with timeseries data, is typically reasonably static, it can change over time. Thus, when timeseries data is being queried or processed, such as querying aggregates calculated from timeseries data or in calculating such aggregates (e.g., for storage and later query or as part of a query being executed on "raw," unaggregated, timeseries data), it can be important to ensure that a correct set of master data is being used with the timeseries data. That is, a current set of master data may not represent master data as it existed when the timeseries data was recorded. In the case where different mater data values exist for different time periods, disclosed technologies allow timeseries data to be joined, or otherwise integrated, with master data values that were valid (specified) for a time period associated with the timeseries data.

Consider a scenario of one or more IOT devices, each with one or more hardware sensors, incorporated into a particular piece of equipment, such as a tank. One or more sensors of the IOT devices may be used to measure a fill level of a tank, where the fill level may be used for various purposes, such as to charge a customer based on usage of a material stored in the tank, to determine when the tank should be refilled, to determine whether the tank has a leak, calculating a shipping weight for the tank, etc.

In the case where fill level is used to charge a customer for use of material contained in the tank, it can be seen how it would be important to ensure that the correct customer (a master data attribute) is used. Otherwise, if customer A transferred the tank to customer B, a query for fill levels (timeseries data) might result in customer B (the current master data value) being charged for material use that was attributable to customer A. Similarly, a search for tanks located (at some point) at location A may produce incorrect results if the master data currently shows the tank at location B, but in fact the tank was located for a period of time at location A.

The present disclosure provides technologies for correlating timeseries data with master data, where at least some master data attributes change over time. One or more master data attributes are identified for tracking. Typically, these master data attributes are those that affect how aggregates are calculated, that affect query results, or that affect, or used in generating, visualization of query results. An association between a particular attribute of timeseries data, such as a "ThingID" for a "Thing", and a particular set of one or more master data attribute values is created and stored. In particular implementations, associations between particular timeseries data and particular master data are stored in a relational database table, or in an instance of a data element, such as an instance of a data type (e.g., a primitive, compositive, or abstract data type) or data object (e.g., an instance of an abstract data type using object-oriented programming principles, such as an instance of a class). The data element can be stored in a data structure (e.g., a tree, heap, graph, list, stack, queue, etc.).

A Thing can represent a particular analog world object associated with one or more IOT devices. Examples of Things include cars, tanks, pumps, etc. Things are typically associated with a model or schema, where the model or schema includes elements identifier various components that might be associated with a particular thing, where those components might be associated with particular IOT data or other types of data (including master data or other semantic data). Things can have instances, in a similar manner as data objects in a programming language can have instances. So, for example, there may be multiple instances of a particular model of a car or a particular model of a pump. In addition to timeseries data. Things can be associated with other values (e.g., ThingID, a serial number), including values that may be associated with master data (e.g., a location of a Thing, a person or entity who owns or has possession of the Thing).

If a change to a tracked master data element is detected, information is stored that enables identification of which master data value applies to timeseries data (e.g., for the "Thing") at a particular time period. Thus, when a process, such as a query or aggregate generation process, is associated with data at a particular time, the process can use the time to determine which master data value or values applied during that time.

The disclosed technologies provide a variety of advantages. For example, query accuracy is improved by helping ensure that timeseries data is associated with the correct master data, including by automatically updating master data used with timeseries data when a change to relevant master data is determined. In addition, query performance can be improved, as appropriate values can be retrieved using smaller data sets/fewer JOIN operations. That is, in some cases data that might be used to determine which master data should be applied to a particular type or set of timeseries data can be stored in additional tables, but using this data may be more complicated (e.g., a more complex query need be written, and may require more detailed knowledge of a schema or data model in order to construct such a query) and resource intensive (e.g., higher processor and memory use, and query execution time), such if more JOIN operations are required as compared with disclosed techniques. JOIN operations can be particularly computationally expensive if they involve comparing time periods between rows (or other table elements) of tables being joined.

In some cases, processing can be further enhanced using particular data models provided by the present disclosure. For example, disclosed technologies can store relevant master data attributes in a single table, where normally these master data attributes are located in a greater of number of tables. Consolidating (e.g., denormalizing) the master data can facilitate query processing by requiring fewer JOIN operations.

Example 2—Example Computing Environment for Receiving and Processing Timeseries Data and Master Data FIG. 1 illustrates an example computing environment 100 in which disclosed technologies can be implemented. The computing environment 100 includes a plurality of IOT devices 104, each of which has one or more hardware sensors 108. At least a portion of the IOT devices 104, such as devices 104a, 104b, can be associated with a common analog world object 112 (e.g., a "Thing"), such as a car, a pump, a tank, a piece of production equipment etc. The other IOT devices 104 can also be associated with analog world objects 112, such as shown for IOT device 104c.

Data from the IOT devices 104 is typically transmitted, such as over a network, to a data store 114. The data store 114 can be a storage system, such as a database, that is configured to store large amounts of data, such as APACHE CASSANDRA. In some cases, the data store 114 can be implemented in a hyperscalar computing system. As shown, the data store 114 stores raw timeseries data 118, as well as aggregated data 122 produced by an aggregator 126. The aggregator 126 typically is programmed with rules that determine how aggregates are calculated, including particular aggregated values/value types (e.g., max, min, average, sum, count), a time period used for aggregate calculations (e.g., hourly, daily), a time period when aggregate calculations are performed (e.g., performing aggregate calculations once per day to calculate hourly aggregates for a preceding time period), and particular groupings of IOT devices 104 or sensors 108 (including sensors from different IOT devices or different analog world objects 112) whose data will be aggregated.

The data store 114 is shown as including a change detector 130. The change detector 130 can determine when new or updated raw timeseries data 118 or aggregated data 122 is available. In the case of new or updated raw timeseries data 118, the change detector 130 can cause the aggregator 126 to generate new or updated aggregated data 122. Triggers 134 can be defined so that other computing systems or components in the computing environment 100 can be notified of new or updated raw timeseries data 118 or aggregated data 122. In a particular embodiment, triggers 134 can be implemented using a queue, where another computing system or component can retrieve updates (actual updated information or information describing updated information, such as an identifier of the updated information and an identifier of a location from which the updated information can be retrieved).

Typically, data analysis of IOT data operates on aggregated data 122 rather than raw timeseries data 118 (i.e., the individual data points from which aggregate values are calculated). Both the raw timeseries data 118 and the aggregated data 122 may have retention periods, but the raw timeseries data typically has a shorter retention period than any retention period that may be defined for the aggregated data.

Consistent with data analysis of IOT data being performed on aggregated data 122, the aggregated data may be transferred to another computing system for further processing or analysis. As shown, at least a portion of the aggregated data 122 is sent to a data processing system 140, such as a relational database management system. The data processing system 140 can be configured to process aggregated data 122 for use by end users or consuming software applications. In order to help determine what aggregated data 122 is responsive to a particular query, and to provide information for displaying or analyzing the aggregated data (or query results using the aggregated data), the aggregated data can be joined with master data, as described in Example 1.

The data processing system 140 includes a data store 144, which can be implemented as relational database tables. The data store 144 includes aggregated data 148, which can correspond to at least a portion of the aggregated data 122. The data store 144 also stores master data 152, which can represent at least a portion of master data 174 stored by one or more client computing systems 170. The data processing system 140 includes a query processor 156 that processes queries from the client computing systems 170.

The client computing systems 170 can have one or more applications 178 that process timeseries data or query results based at least in part on timeseries data. A client computing system 170 can include a query modeler 182. The query modeler 182 allows a user or process to specify queries to be executed on the data processing system 140. As part of the query modelling, a user or process may specify one or more attributes of the master data 174 to be processed using disclosed technologies. That it, attributes of the master data 174 selected by the user or process can be tracked for changes, and information regarding what master data was in effect for particular timeseries data at particular times can be stored in the data store 144 as change data 160. For example, as described with respect to FIG. 2, a table can store master data values for one or more attributes and time periods for which given combinations of master data values are valid. In other cases, dates when particular master data values are valid can be stored directly in a primary source of master data, or with aggregates generated from timeseries data.

Information as to what master data attributes should be monitored for changes (e.g., as a result of the query modeler) can be stored as metadata 164 by the data processing system 140 (and can be optionally stored in the data store 144). The metadata 164 can be used to define triggers 166, which can cause the change data 160 to be updated upon a qualifying change to the master data 152. For example, master data attributes included by a user or process in a definition of a query or view can be extracted as metadata 164, which can then be used to place triggers on the appropriate master data (e.g., on a table storing a particular master data attribute used by the query/view). Although shown as part of the data processing system 140, in some cases the triggers 166 can be placed on the computing systems 170. In general, triggers 166 for master data 152, 174 can be database triggers placed on tables holding the relevant master data.

The data processing system 140 can include a change processor 168, which can be used to process changes to the master data 152, changes to the aggregated data 122, or changes to the raw timeseries data 118. In some cases, the change processor 168 receives notifications from the triggers 166 or the triggers 134.

Data in the data processing system 140 can be retrieved by the query processor 156, such as in response to queries issued by a user through an application 178 of a computing system 170. In providing query results, the query processor 156 can access the aggregated data 148 and the master data 152, as will be described, such as performing a JOIN operation using conditions such as a date, a Thing ID (e.g., an identifier of an object 112, where are typically termed in the art as "Things" and can be referred to using a "ThingID"), and an identifier of a particular set of master data that should be used in processing aggregated data 148 for the thing (for example, an identifier that specifies a particular set of master data values that are valid for/to be used with particular aggregate values generated from timeseries data). Or, master data can be retrieved separately from aggregated data using one or more values described in connection with the JOIN operation described above. At least a portion of the master data is master data stored in the change data 160 (for example, master data that is expected to be time-dependent, and thus may be stored separately from master data that is not time dependent, or a store, such as a set of one or more tables, that contains on current master data values).

Figure 2:
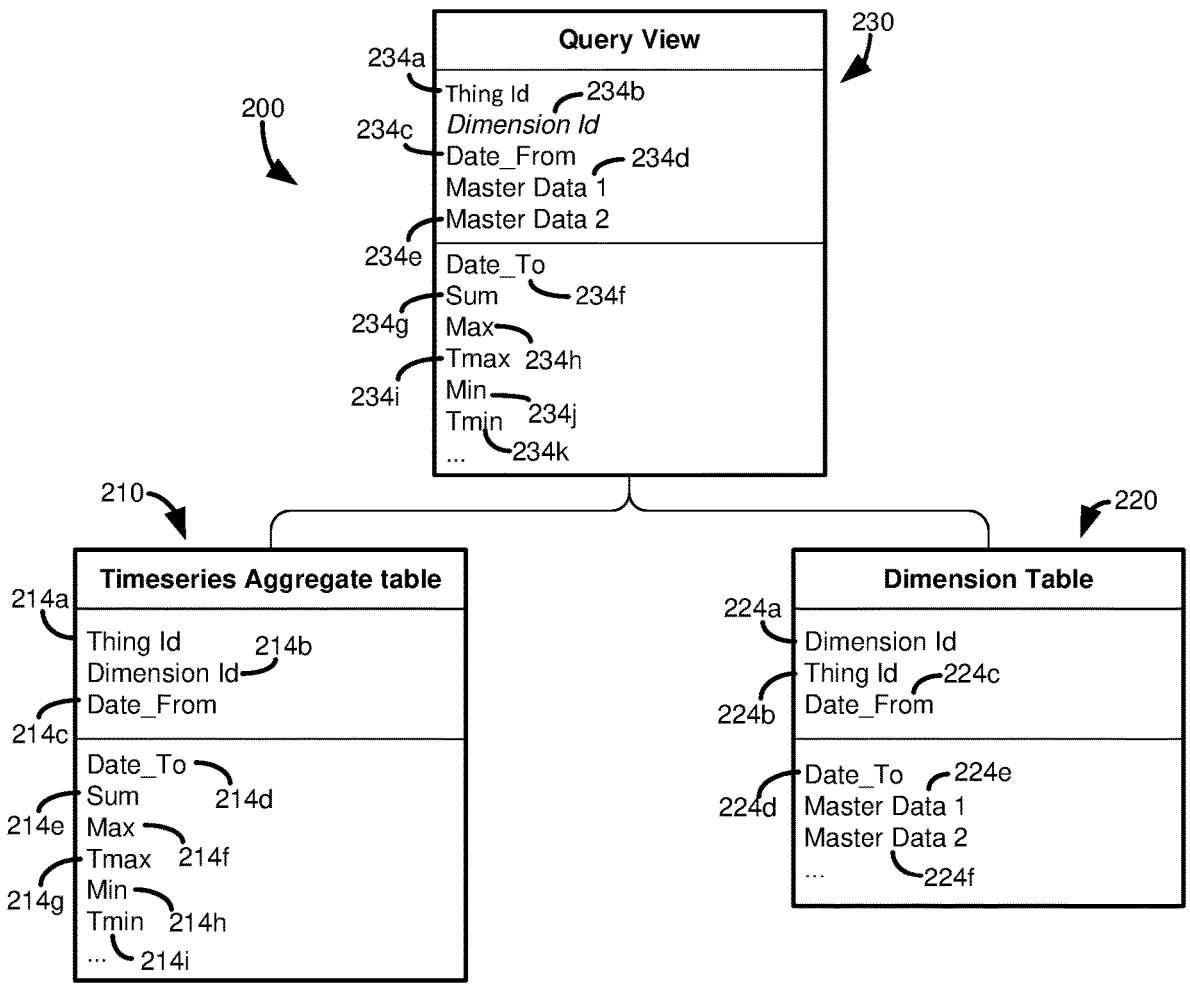
FIG. 2 is a diagram of an example data model showing how a query or view can integrate timeseries data and master data, in the form of a dimension table, where the tables contain information allowing master data effective during a particular time period to be combined with timeseries data for that time period.

Example 3—Example Data Model Useable for Integrating Timeseries Data and Master Data FIG. 2 illustrates an example data model 200 demonstrating how temporally aware sematic data can be combined with other data, such as IOT data, which can be timeseries data. A table 210 is defined to represent aggregated timeseries values, but in other embodiments can represent other types of "factual" data. The table 210 includes a plurality of attributes 214 (shown as attributes 214a-214i) for a Thing ID 214a, a dimension ID 214b (e.g., a particular attribute that can be used in categorizing a set of semantic/master data values), a starting date/time 214c for calculation used in calculating an aggregate, an ending date/time 214d for the aggregation period, and one or more aggregate values, such as sum 214e, max 214f, the time at which the maximum value occurred 214g, a minimum value 214h, and a time at which the minimum value occurred 214i. Other types of aggregate values can be included with, or in place of the, the aggregates values 214e-214i, such as average or count. Attributes 214a-214c are shown as providing a primary key for the table 210, however, the primary key may be defined differently in other implementations.

The table 210 can optionally include multiple records for a given Thing ID 214a and aggregate period (i.e., defined by the attributes 214c, 214d). However, dimensional and aggregate information can be stored in a different manner than in the table 210. For example, a table can be defined that has attributes allowing multiple dimension IDs to be listed for a given row (e.g., dimension ID1, dimension ID2 . . . , where at least one dimension ID contains a value, but other attributes are not assigned a value or are assigned a NULL value). In a further embodiment, a table includes a dimension collection ID, where a dimension collection table can list particular dimension IDs that are associated with a given dimension collection (and thus dimensions for a particular dimension collection ID can be determined through a JOIN of the two tables).

A dimension table 220 associates particular master data attributes with particular things and dimensions over a particular date range. Attributes 224 (shown as attributes 224a-224f) include a dimension ID 224a, a thing ID 224b, a date from 224c, and a date to 224d, which attributes can be analogous to the attributes 214a-214d. Attributes 224a-224c can serve as a primary key for the dimension table 220. The table 220 also includes attributes for one or more master data attribute values, such as master data attribute 1 224e and master data attribute 2 224f as shown. It should be appreciated that a table having the schema of the table 220 can have more or fewer master data attribute than shown.

A view 230 can be constructed that references the tables 210, 220. The view 230 can be a database view, and can be a view whose data is populated upon each reference to the view or can be a materialized view (which can be periodically updated). In other implementations, a query can be used in the place of the view (e.g., a query that includes a JOIN operation for the tables 210, 220). The view 230 is shown as including all of the attributes 214a-214i and 224a-224f as attributes 234a-234k, where attributes 234a-234c and 234f are attributes having common values in attributes 214a-214d and 224a-224d.

Note that the view 230 (or a query having a similar definition) has master data attributes 234d, 234e that are specific to a particular Thing id, Dimension id, and time period (i.e., as represented by attribute 234c and optionally attribute 234f). It can thus be seen how values specified for the view 230 can retrieve different master data based on particular dates specified for the view 230 (or in a query).

With respect to the schema 200, note that the Thing ID is used in both tables 210 and 220 (attributes 214a, 224a), which allows the appropriate Dimension ID (attributes 214b, 224b) to be placed in the aggregate table 210. During query processing, the tables 210 and 220 can be joined using the Dimension ID (that is, the Thing ID need not be used during the JOIN, at least in some implementations).

Example 4—Example Master Data Change Detection and Processing Method

Figure 3:
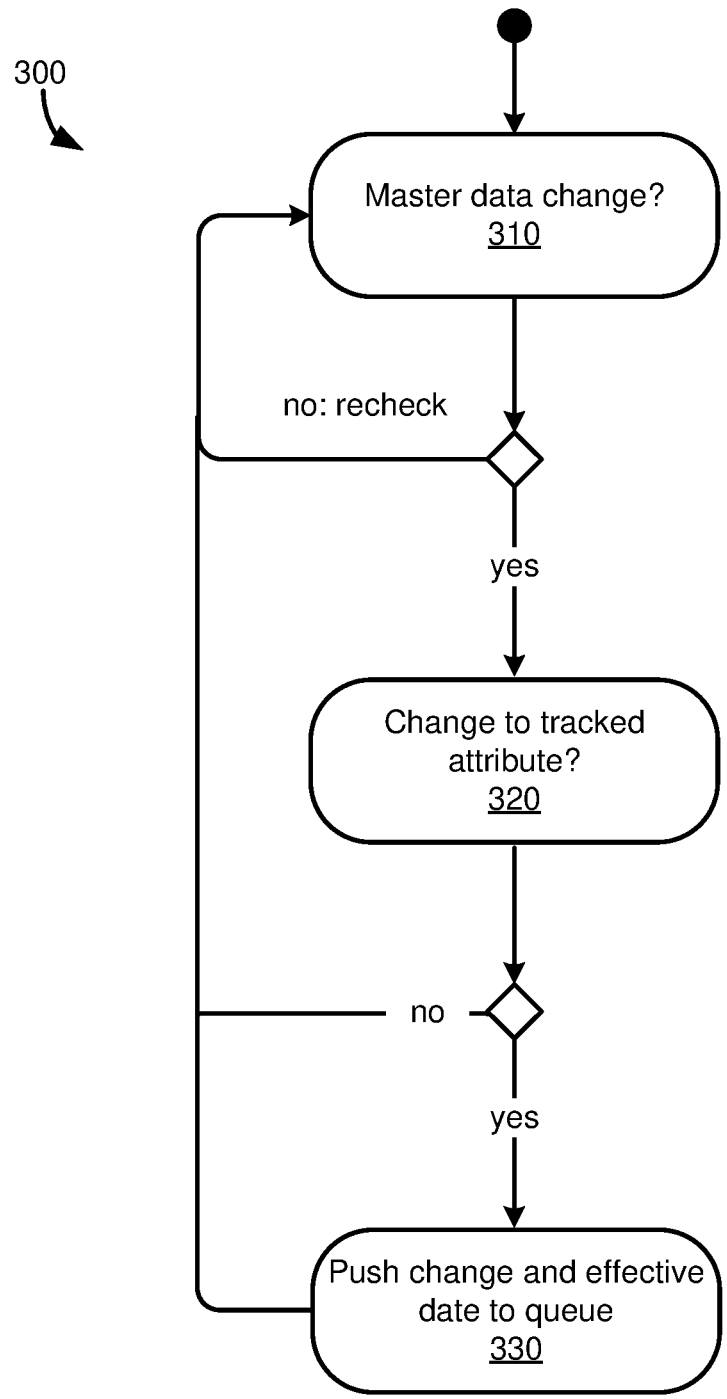
FIG. 3 is a flowchart illustrating how selected master data attributes can be tracked, and master data changes pushed to a queue for processing, such as storing updated master data in the dimension table of FIG. 2.

FIG. 3 is a flowchart of an example method 300 of updating a table having a schema of the table 220. At 310, it is determined if a change to master data (or other semantic data) has been received. If not, the method 300 can loop at 310. If so, the method 300 proceeds to 320 where it is determined whether the changed attribute is an attribute that is being tracked for changes. If not, the method returns to 310. If the change is to a tracked attribute, the change is passed to a master data change queue at 330, and the method returns to 300.

Various information can be included in an entry to the master data change queue at 330. This information includes at least an identifier for the changed master data attribute and an updated value, such as an assignment statement such as "Attribute B=5" or a key value pair such as "A:5." Attribute changes can be specified in other ways, such as in query language (e.g., using an insert or update statement).

Information for a queue entry can include a time associated with the change to one or more master data attributes. In some cases, the time is a time at which the change to master data was executed or was detected by a change detection component. In other cases, a request to change master data can explicitly include an effective date or effective date range. If a time is not explicitly included the request, a default time (e.g., a timestamp based on when the change request was generated or received) can be used.

Information in a master data change can include additional information, such as particular Things or users to which the data change will apply. That is, although typically master data applies to all aspects of an organization, other types of semantic information may be more specific to particular use cases.

Example 5—Example Tables Holding Integrable Timeseries Data and Master Data

FIG. 4 provides specific examples (or instances) of tables having the schema of the tables 210 and 220 of FIG. 2. Table 410 corresponds to table 220 and has attributes 414a-414f corresponding to attributes 224a-224f. Attribute 414a provides a particular dimension ID, which is shown as unique to each row of the table 410. Attribute 414b provides an identifier for a Thing to which the dimension ID of attribute 414a applies. It can be seen that different dimension IDs apply to different Thing IDs. For example, the dimension ID, D1, of row 418a applies to thing T1, but does not apply to thing T2. Similarly, dimension ID, D5, of row 418b applies to thing T2, but does not apply to thing T1. In other cases, multiple Things can have the same Dimension ID. However, in this case, JOIN parameters may need to be altered (e.g., joining on Thing ID and Dimension ID, rather than just Dimension ID).

Each row 418 of the table 410 is associated with a time period defined by a start date attribute 414c and an end date attribute 414d. The dates for attributes 414c, 414d are shown as listed in units of discrete days. However, time periods can be tracked at different levels of granularity, such as by hour, minutes, second, and date. Time periods associated with the attributes 414c, 414d can correspond to time periods used to calculate aggregates. Thus, it can be the case that a portion of a particular day is used in calculating a first aggregate and another portion of that day is used in calculating a second aggregate. Depending on the particular use case (e.g., query, view, analysis request) then, different sub-portions of a longer time period (e.g., particular portions of a single day) can be used in calculating different aggregates, or all or multiple such sub-portions can be combined for a single element (e.g., when a particular dimension or master data attribute is not used to filter data used in aggregate calculation).

It can be seen in table 410 that each row 418 has a unique set of master data attributes 414e, 414f, at least for a particular Thing. However, as long as at least one tracked master attribute value changes compared with (differs from) a prior value, a new entry can be added to the table 410. Thus, although not shown in table 410, two rows 418 can have the same master data values, provided that the time period attributes 414c, 414d are different. Similarly, two rows 418 can have identical time period attributes 414c, 414d, provided that the rows have different values for the Thing ID attribute 414b.

The time attributes 414c, 414d typically are unique (e.g., non-overlapping), at least as to any particular value for the Thing ID attribute 414b. In some cases, the time attributes 414c, 414d are also constrained to be continuous, in that time gaps are not permitted. In other cases, time gaps may be allowed, and processing logic may appropriately handle a scenario where an entry in the table 410 does not exist for all or a portion of a time period used with a query or view. For example, the processing logic can be configured to return an error, to ignore master data values for which data does not exist in the table 410, or can be configured to use another value, such as a default value or value preceding or following a particular date for which data is not provided in the table 410.

In the case where gaps are not permitted in a time period, the table 410 (or the table 430) can have a modified version of the corresponding schema of FIG. 2. For example, rather than having attributes 414c, 414d defining a time period, a single attribute can be provided which, for example, provides a starting time for the time period, where the time period is assumed to run until the next later time period listed in the table 410. So, for example, if the table included entries for April 23 and May 28, the time period for April 23 could be assumed to run from April 23 to May 27.

Table 430 corresponds to table 210 of FIG. 2. Table 430 illustrates how a given combination of a Thing ID value for an attribute 434a and a Dimension ID value for an attribute 434b can have multiple rows 438 in the table 430. Aggregates may be calculated at regular intervals or upon the occurrence of other conditions (e.g., occurrence of a particular signal, upon a threshold amount of data being collected, upon request by a user or process). Until a master data change occurs, aggregates can continue to be produced and recorded in the table 430 using the same dimension ID.

As shown in table 430, each aggregate value (attributes 434e, 434f, 434g) represents data aggregates calculated for a particular day. The time period attributes 434c, 434d can be implemented in a similar manner as described for the time period attributes 414c, 414d, such as constraining the values (at least for a particular Thing ID) to be unique/non-overlapping.

FIG. 4 illustrates pseudocode for two example queries 450, 460 that can be executed on the tables 410, 430. For these example queries 450, 460, the master data attribute A, 414e, can represent an entity having possession of a particular Thing (such as a tank) represented by a Thing ID value for the attribute 414b, while the master data attribute B, 414f, can represent a location of the tank.

Query 450 retrieves the sum aggregate value (corresponding to attribute 434g) and the value of attribute B, 414f, for a specified entity BP1 (value of master attribute A, 414e) during a particular date range. It can be seen that query 450 will retrieve data only associated with dimension IDs (attribute 414a) D2, D5, and D6, as dimension D1 is outside of the requested timeframe and dimensions D3 and D4 are associated with BP2.

Query 460 is similar to query 450, but does not constrain attribute A, 414e, to a particular value. Thus, query 460 will return SUM values for BP1 and BP2 at all locations. However, the master data attributes 414e, 414f can be used in defining aggregates, such as defining aggregates without reference to any master data, with reference to a single master data attribute (e.g., aggregate by BP but not by location), or with reference to multiple master data attribute (e.g., aggregate by BP and location). These master data attributes can also be used in data visualizations, such as providing labels to be applied to data in a visualization.

In some cases, master data attributes can be used to further aggregate already aggregated data. That is, for example, data may be aggregated granularly by each master data attribute value, and results can be further combined based on particular query/view parameters. For example, data may be aggregated by BP and location, but can be further aggregated if a query/view definition does not specify that results should be broken down by location, in which case values for a given BP irrespective of location can be combined. Similarly, master data can be used to partially disaggregate data that may initially be stored only by date (provided that the aggregated data is associated with information allowing appropriate master data to be associated with the aggregated data, such as a date or a dimension identifier, as in table 430).

Example 6—Example Master Data Change Processing Method

Figure 5:
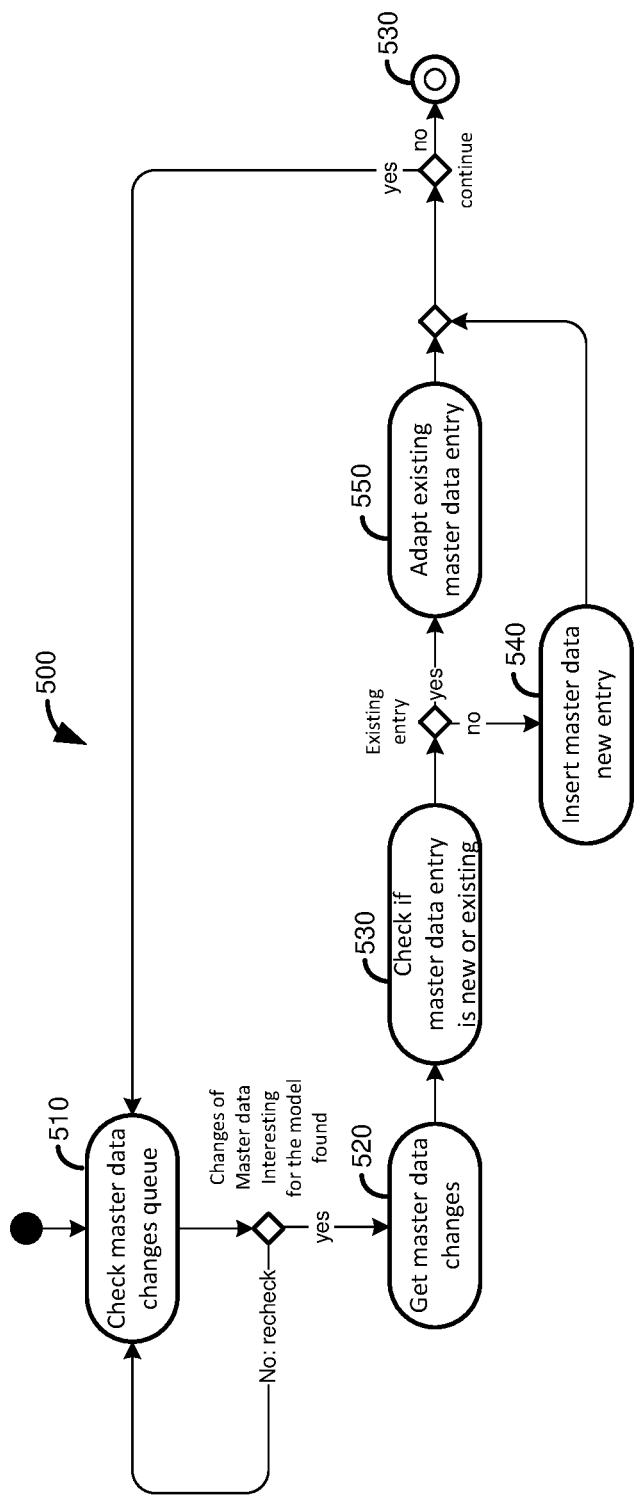
FIG. 5 is a flowchart of a method of inserting new master data entries, or updating master data entries, when changes to tracked master data attributes are received.

FIG. 5 is a flowchart of a method 500 for processing master data changes. At 510, a master data change queue is polled to determine if any master data changes have been enqueued for processing. As described in connection with the method 300 of FIG. 3, at least in some implementations, master data changes can be checked to determine whether they related to a tracked master data attribute. If no changes are present in the queue, the method can loop back to 510.

If changes are present in the queue, the changes are retrieved and analyzed at 520. At 530, it is determined if the master data change is a new entry or an update to a prior entry. If the master data is new, the new set of master data values can be stored at 540, such as by inserting a row into a table containing master data information (e.g., a table having a schema analogous to table 220 of FIG. 2 or 410 of FIG. 4). If the master data represents a change or update to existing master data (e.g., for a current time period or a prior time period, as opposed to master data to be used for new aggregates), existing master data can be updated at 550 (such as by updating values in a row of a table storing master data values or deleting an existing row and inserting a new row). Typically, after 540, 550, the method 500 returns to 510. However, the method can be terminated (such as manually or upon the occurrence of a specific condition) at 560.

Example 7—Example Method for Updating Aggregates Based on Changed Master Data

Figure 6:
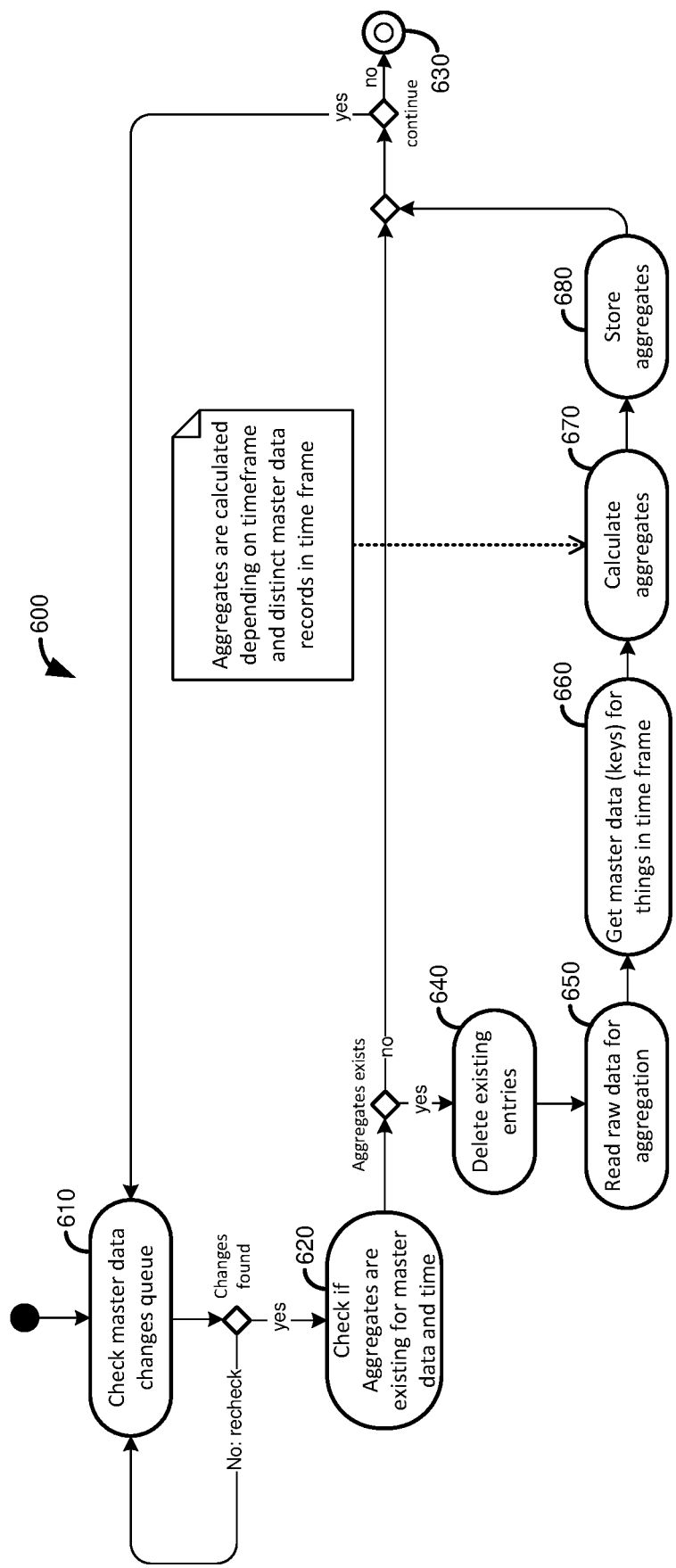
FIG. 6 is a flowchart of a method of updating or recalculating aggregates if master data for an aggregation period changes.

FIG. 6 is a flowchart of a method 600 for updating aggregates based on changes to master data. That is, a change to master data can result in new or updated master data values being stored, such as using the method 500 of FIG. 5. However, as has been described, master data can be used to determine how aggregates are calculated. Thus, a change to master data for a previously-calculated aggregate can cause such aggregate to no longer be valid/accurate. As an example, master data for a time period may have originally had a single value for an attribute over a time period. A change to master data may result in that time period being split into two or more new periods, each with its own combination of master data values. Assume that a single time period is split into two, one with an original master data value and another with a new master data value. A prior aggregate for the original data would no longer be accurate, and instead two new aggregates are calculated, one for each of the new time periods. Master data may also change if a query, view, or other definition source is revised.

A master data change queue is examined at 610, which can be analogous to 510 of the method 500 of FIG. 5. If no changes are found, the method 600 can loop back to 610. If master data changes are identified, it is determined at 620 whether aggregates exist for a time period associated with the changed master data. If not, the method 600 can loop back to 610, or can terminate at 630, such as if the method is manually terminated or automatically based on the satisfaction of particular criteria.

If it is determined at 620 that one or more aggregates exists for a time period covered by the master data change, such aggregates can be deleted at 640. After deleting existing aggregates at 640, raw data is read for aggregation at 650. The raw data can be individual timeseries data points (e.g., from one or more IOT devices), or timeseries data that is aggregated at a more granular level than an aggregate to be calculated. For example, if data is initially received every minute, it may initially be aggregated hourly. In that example, reading data at 650 can involve reading the previously-calculated hourly aggregate values. Note that, if a new aggregate is calculated at a coarser level than previously-calculated, more granular aggregates, the particular types of aggregated values can be the same or different. For example, the hourly aggregates may include values such as SUM and count, while daily aggregates may include SUM, AVG, MIN, and MAX, but may omit count.

At least a portion of master data for the appropriate aggregation period is obtained at 660. The master data can include a single set of values for the aggregation period, or can include multiple sets of values (e.g., the aggregation period be within a period where a single set of master data attribute values are specified, or multiple sets of master data may exist for the aggregation period). In some cases, obtaining master data can involve querying a table analogous to the table 220 of FIG. 2 or 410 of FIG. 4 (e.g., SELECT <relevant master data attributes> WHERE <specified thingID> AND <master data time period is within aggregate time period>). In some cases, rather than reading all master data, only selected master data values are read, where these selected master data values are used to assign dimension identifiers (e.g., attribute 414*a* of table 410 of FIG. 4) to aggregates being generated. In particular, 660 can include reading ThingID and DIM_ID attributes (attributes 414*a*, 414*b* of table 410), which can be assigned to aggregate values as shown in table 430.

Aggregates can be calculated at 670. Typically, aggregates are calculated based on the timeframe (e.g., by minute, hour, day, etc.) and set of distinct master data attribute values (e.g., by minute for set 1, by minute for set 2). Sets of distinct master data attributes values, and thus corresponding aggregates, can be defined by particular DIM_ID attribute values, which in turn correspond to particular validity periods for particular sets of master data values. In other words, the master data values themselves may not define a "set," but rather the sets are based on discrete validity periods (corresponding to rows 418 of the table 410) within a time period relevant to a query (e.g., aggregates may be calculated for multiple subperiods, corresponding to DIM_ID validity periods, that are subsumed within a time period specified in a query).

The aggregates are stored at 680, such as in a table having a format analogous to the table 220 of FIG. 2 or 430 of FIG. 4. As described in preceding Examples, a query/view can access both the aggregated values and the master data associated with the aggregated values. Typically, after 680, the method 600 returns to 610. However, the method can be terminated (such as manually or upon the occurrence of a specific condition) at 630.

Although the overall method 600 has been described with respect to calculation of aggregates in view of master data changes, it should be appreciated that 650-680 can reflect aggregation carried out in the absence of master data changes. That is, reading master data at 660 will read appropriate master data for the aggregates, whether the master data is new, existing, updated, etc. In some cases, 650-680 can be processes included in recalculated aggregates based on changes to definitions of aggregation processes or to timeseries data used in calculating aggregates (e.g., new or updated timeseries data).

Figure 7:
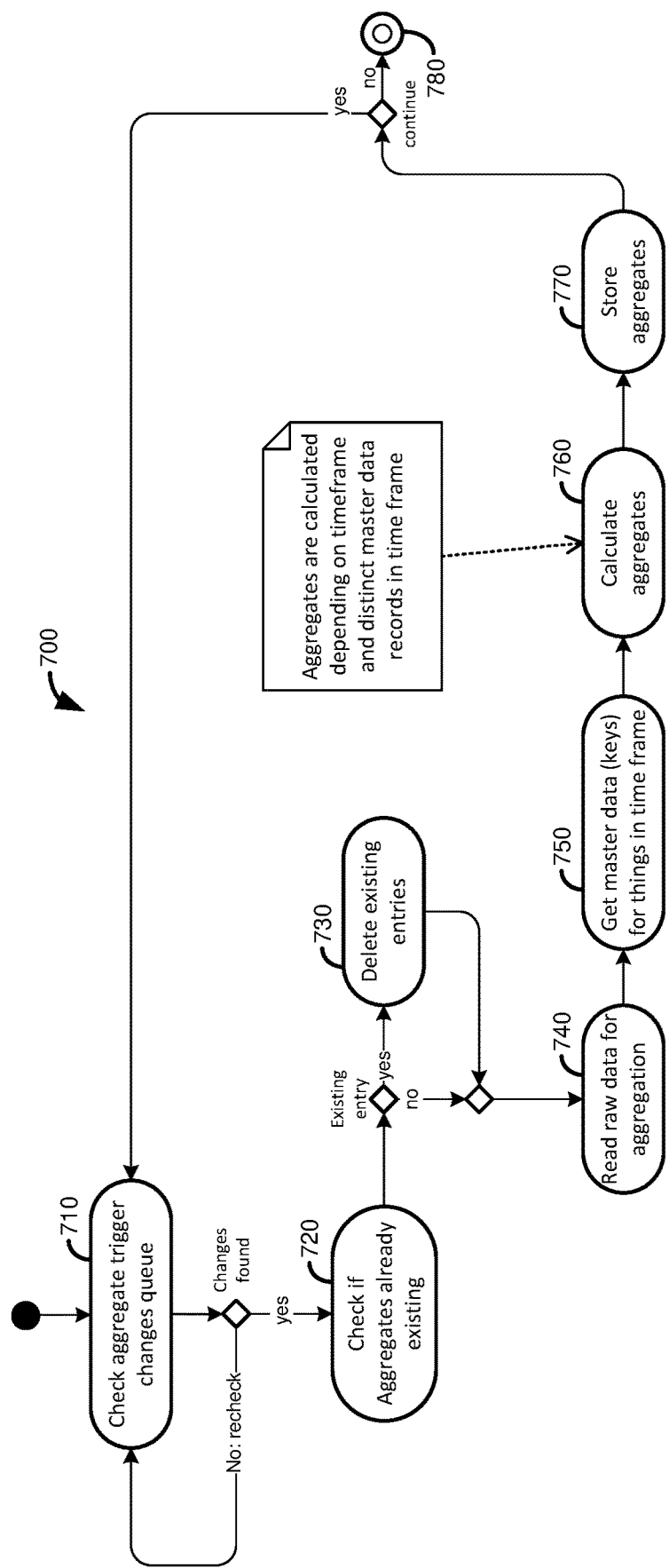
FIG. 7 is a flowchart of a method of generating aggregates when new or updated timeseries data is available.

Example 8—Example Update of Timeseries Aggregates Based on New or Updated Timeseries Data In addition to updating aggregations based on changes to master data, as described in Example 7, aggregations may be recalculated based on changes to aggregation data (e.g., new or different timeseries data points or new, less granular, aggregates are available) or aggregation parameters (e.g., new or different aggregate values are specified for calculation, a time period for aggregate calculation, such as hourly instead of, or in addition to, aggregates calculated by minute intervals). A method 700 of FIG. 7 can be used to determine whether aggregates should be recalculated, and if so, to recalculate the aggregates.

At 710 it is determined if an aggregate change has been placed in a queue. That is, when new timeseries of less granular aggregate data, or new/updated aggregate parameters are available, a job can be enqueued for processing. If no changes are pending in the queue, the method 700 can loop at 710. If changes are present in the queue, a change can be dequeued for processing. It is determined at 720 whether an aggregate exists corresponding to a time period associated with the aggregation task being processed. If so, the existing aggregates can be deleted at 730 (or, at least any aggregates that would be duplicative of/inconsistent with aggregates requested in the task).

After the aggregates have been deleted at 730, or if no aggregates required deletion, raw data for aggregation can be read at 740. As with the method 600, the raw data can represent individual timeseries data points or can represent aggregates that are less granular than an aggregate to be calculated. Master data associated with the raw data can be retrieved at 750, such as based on a timeframe for the aggregation and optionally additional parameters, such as a Thing identifier. As with the process 600, in some cases, rather than reading all master data, only selected master data values are read, where these selected master data values are used to assign dimension identifiers (e.g., attribute 414a of table 410 of FIG. 4) to aggregates being generated. In particular, 750 can include reading ThingID and DIM_ID attributes (attributes 414a, 414b of table 410), which can be assigned to aggregate values as shown in table 430.

The aggregates are calculated at 760 and stored at 770, such as in tables analogous to table 210 of FIG. 2 or table 430 of FIG. 4. After the aggregates are stored, the method 700 can loop back to 710 or can terminate at 780, such as in response to a manual termination request or if it is determined that stopping criteria have been satisfied.

Figure 8:
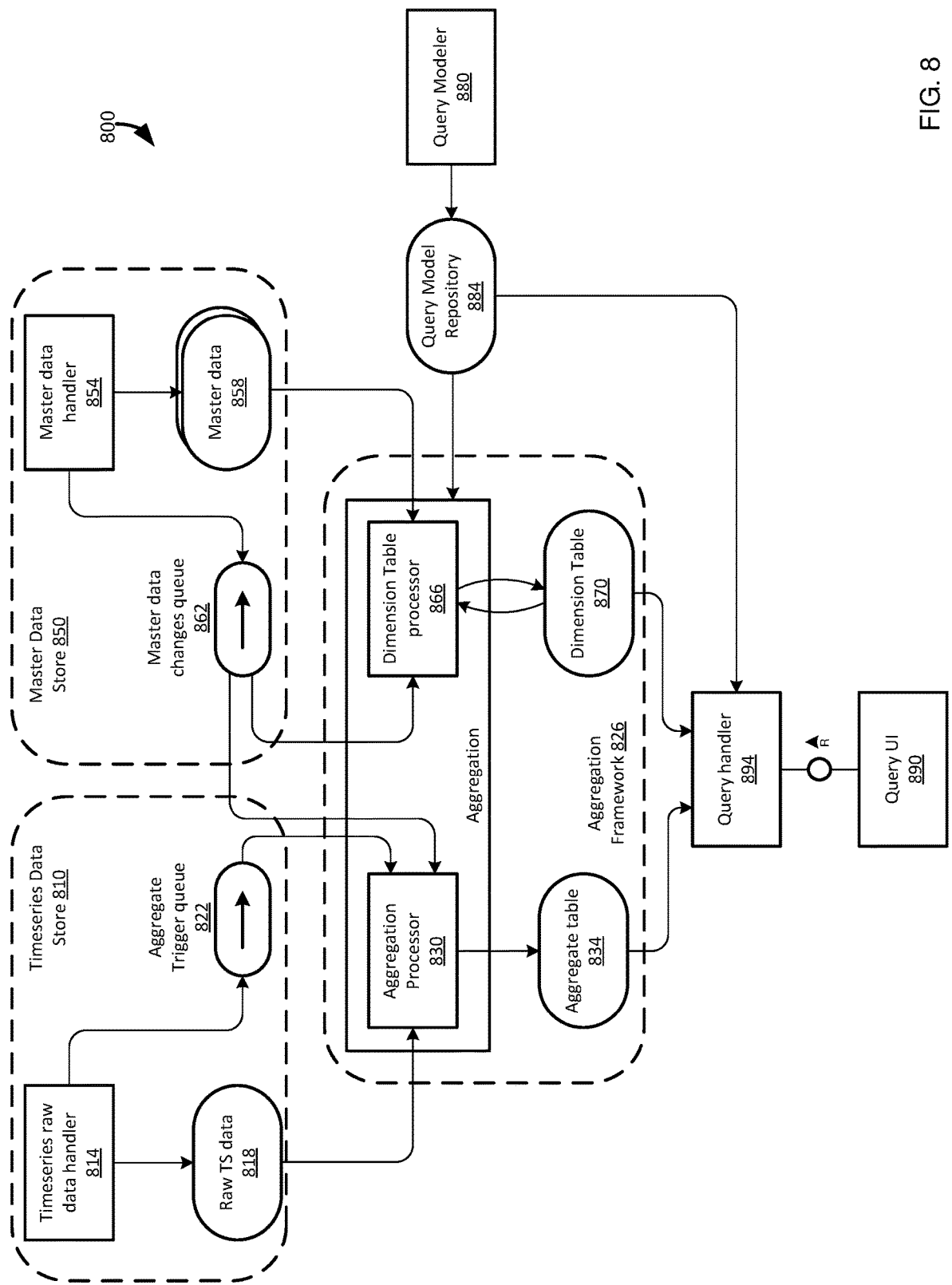
FIG. 8 illustrates an example computing infrastructure in which disclosed technologies can be implemented.

Example 9—Example Computing Architecture for Query Processing of Queries Integrating Timeseries Data and Time Dependent Master Data FIG. 8 illustrates a computing architecture 800 in which disclosed technologies can be implemented. The computer architecture 800 includes a timeseries data store 810. The timeseries data store 810 can store raw timeseries data 818. In some cases, the timeseries data store 810 can be provided using a hyperscalar service (e.g., a cloud service, such as AMAZON WEB SERVICES or MICROSOFT AZURE) and can use a storage system that is designed to handle large volumes of data, such as a NoSQL database system, for example, APACHE CASSANDRA. When timeseries data is ingested by the timeseries data store 810, it can be processed by a timeseries data handler 814. The timeseries data handler 814 can perform operations such as determining a location (e.g., file path) where the data should be stored, applying a data retention policy, annotating the raw timeseries data, or performing other types of processing with the raw timeseries data (e.g., aggregating the timeseries data, but at a more granular level than is likely to be produced by other aggregation components of the computing architecture 800).

When new or updated timeseries data 818 is available, the timeseries data handler 814 can enqueue a notification in an aggregate trigger queue 822. For example, when sufficient data is available for a specified aggregation period (e.g., minute, hour, day), a notification can be placed in the queue 822. Or, when updated or additional data is received for a prior aggregation period the timeseries data handler can enqueue a notification in the queue.

The queue 822 can be accessed by an aggregation processor 830 of an aggregation framework 826. Although shown as separate from the timeseries data store 810, in some implementations the aggregation framework 826 can be part of the timeseries data store. The aggregation processor 830 can periodically poll the queue 822 to determine if an aggregate calculation job is available, such as using an API provided by the timeseries data store 810. In other cases, the timeseries data store 810 can notify the aggregation processor 830 that new jobs are in the queue 822, or can send the jobs to the aggregation processor for processing.

The aggregation processor 830 can retrieve timeseries data 818 from the timeseries data store 810 needed to process a dequeued job. For example, the job can specify a location of the relevant timeseries data in the timeseries data store 810. The aggregation processor 830 can process the raw timeseries data 818 to produce one or more aggregate values (where a set of values for a particular aggregation job are generally referred to as "an aggregate"). The aggregation processor 830 can calculate values such as MIN, MAX, COUNT, AVERAGE, SUM, etc.

Aggregates for a particular aggregation job can be calculated based on a single time period or other criteria, or can be calculated for multiple time periods/multiple sets of criteria. For instance, a job can specify that only hourly aggregates are calculated, or can specify that both hourly and daily aggregates should be calculated. In another scenario, a job can specify that aggregates should be calculated only for timeseries data meeting particular criteria, such as being associated with a particular master data value or set of master data values (e.g., aggregate timeseries data for a particular location or customer).

Aggregates calculated by the aggregation processor can be stored in one or more aggregate tables 834. In a particular embodiment, the aggregate tables 834 can have the schema of the table 210 of FIG. 2 or the table 430 of FIG. 4, or which is analogous thereto-such as having aggregate values, identifiers for one or more things associated with the aggregate values in a given row, and information sufficient to identify master data associated with a given row.

The computing architecture 800 includes a master data data store 850, which can allow master data to be created, deleted, modified, and stored. Requests relating to such activities can be processed by a master data handler 854, including being stored by the master data handler as master data 858. In at least some cases, requests to change, add, or delete master data can involve the master data handler 854 enqueuing a master data change job to a master data change queue 862. The master data handler 854 can determine whether a given master data change should involve pushing a job to the queue 862, such as determining if a view or query has been selected to track changes to master data that is the subject of a particular request being processed by the master data handler.

The master data change queue 862 can be read by a dimension table processor 866, which can be a component of the aggregation framework 826, such as using an API provided by the master data data store 850 for accessing the queue. In other cases, the master data data store 850 can push notifications to the dimension table processor 866 when new jobs are available (and optionally can send the job itself to the dimension table processor rather than having the dimension table processor retrieve the jobs from the queue 862). The dimension table processor 866 can store master data in dimension tables 870.

The dimension tables 870 can, in some implementations, store data in a schema analogous to the table 220 of FIG. 2 or table 410 of FIG. 4. For example, the dimension tables 870 can have attributes (columns) for a thing ID, a date, a dimension ID, and one or more master data attributes. Although the master data 858 is also typically stored in tables, such tables can have one or more differences from the dimension tables 870. For example, the master data 858 is typically a current set of master data, although in some cases master data 858 can store prior versions of master data.

In addition, master data 858 may be organized according to a different schema than that used for the dimension tables 870. In particular, a given dimension table 870 can include master data attributes from multiple master data tables of the master data 858, and thus can represent denormalized data. One consequence of this denormalization is that data can be obtained more quickly and with fewer computing resources from the dimension tables 870 as compared with the master data, such as by reducing the number of JOIN operations. JOIN operations can be reduced if retrieving data from the master data 858 may involve accessing multiple master data tables, both because of a given schema, where data may be normalized, and because multiple tables may exist even for a given table of master data (e.g., current tables versus historical tables containing master data that was active at a prior point in time).

The aggregation processor 830 can optionally access the dimension tables 870, such as for determining how the raw timeseries data 818 should be aggregated in producing a given aggregate table 834. For example, the aggregation processor 830 can use a Thing ID and a date range to identify master data attributes used in defining how aggregates should be calculated (e.g., as in prior example, determining if aggregates should be on the level of business partner, location, or by business partner and location).

In at least some embodiments, a particular definition is used to define what master data attributes will be tracked for changes. There can be many (hundreds or thousands) of master data attributes in an enterprise system, and it may not be necessary or feasible to track changes for all of them. As has been described, in some examples a definition of master data attributes to track can be provided by a definition of a query or view. That is, master data attributes specified in a query or view can be extracted and used as the master data attributes included in a table such as the table 410 of FIG. 4.

The computing environment 800 of FIG. 8 can provide a query modeler component 880 that a user or process can use to define a view, query, or other type of definition, where the definition typically includes elements that can be used to identify particular timeseries data of interest (e.g., a Thing ID, a timeframe, one or more types of aggregate values) and elements that can be used to identify mater data attributes that can be used, for example, to provide semantic meaning to the timeseries data or which can be used at least in part to aggregate timeseries data.

The query, view, or other definition can be stored in a query model repository 884, which can be accessed by the aggregation framework 826, such as by the aggregation processor 830 or the dimension table processor 866. These components can extract information from the query model repository 884, such as an identifier for the query, which can be used in some cases to select or create aggregate tables 834 or dimension tables 870 (including particular attributes/values to be used with such tables).

A user or process can query data using a query user interface 890. The query user interface 890 can, in some implementations, request execution of a query, view, or other definition modelled using the query modeler component 880. The query can then be processed by a query handler (or query processor) 894, which can retrieve the relevant data from the relevant aggregate tables 834 and the relevant dimension tables 870, returning query results to the requesting user or process.

Example 10—Example Operations

Figure 9:
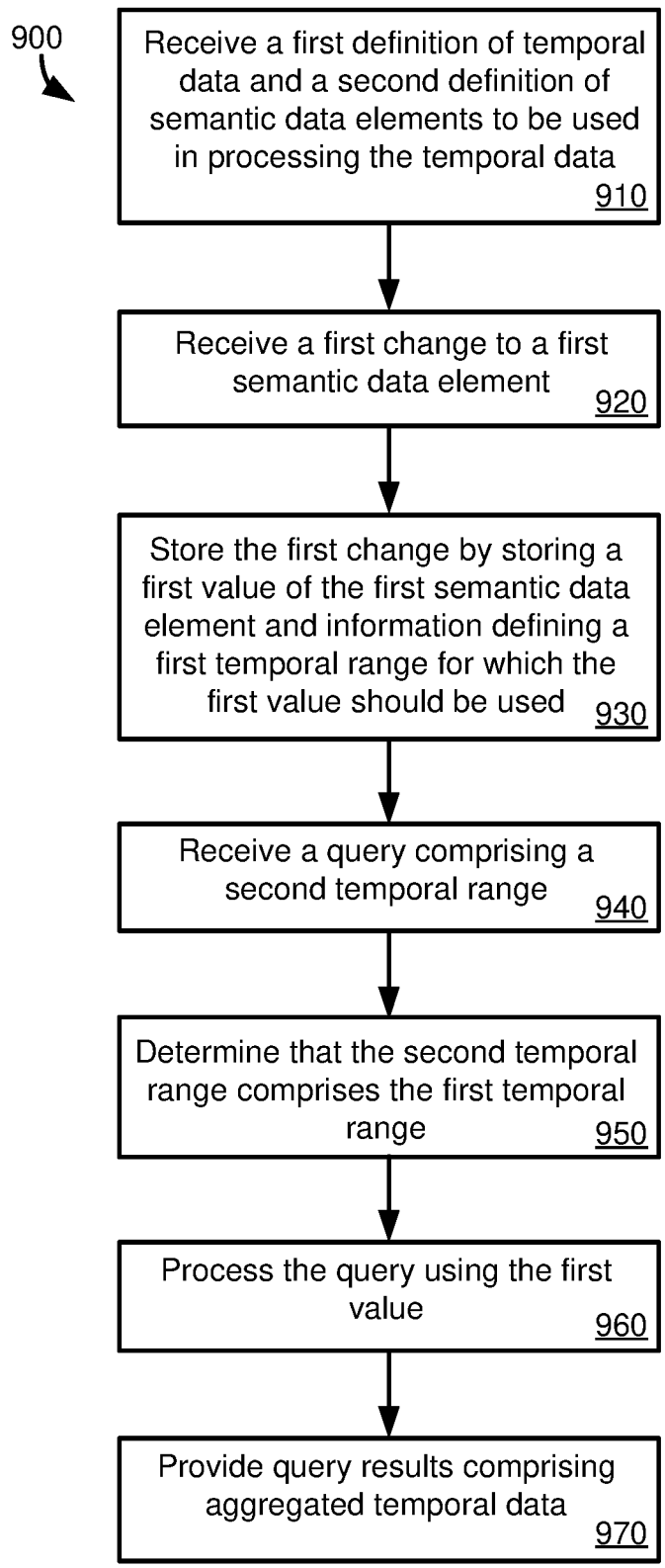
FIG. 9 is a flowchart of an example method for integrating timeseries data and master data in generating aggregates of the timeseries data.

FIG. 9 is a flowchart of a method 900 for integrating temporal data (timeseries data) and time dependent semantic data (such as one or more master data attributes that can change over time). The method 900 can be implemented in the computing environment 100 of FIG. 1 or the computing architecture 800 of FIG. 8, using techniques described in Examples 1-9.

At 910, a first definition of temporal data to be retrieved from a database is received along with a second definition of one or more semantic data elements to be used in processing the temporal data. The definition can be, for example, provided in a model of a query or view. A first change to a first semantic data element of the one or more semantic data elements is received at 920. The first change to the first semantic data element is stored at 930, where the storing includes storing a first value of the first semantic data element and information defining a first temporal range (e.g., a time period) for which the first value should be used.

A query is received at 940. The query includes a second temporal range (or time period). At 950, it is determined that the second temporal range includes the first temporal range (the second temporal range overlaps all or part of the first temporal range). The query is processed at 960 using the first value, based on determining that the second temporal range includes the first temporal range. Query results are provided in response to the receiving the query at 970, where the query results include aggregated temporal data (e.g., one or more aggregate values calculated from the temporal data).

Example 11—Computing Systems

Figure 10:
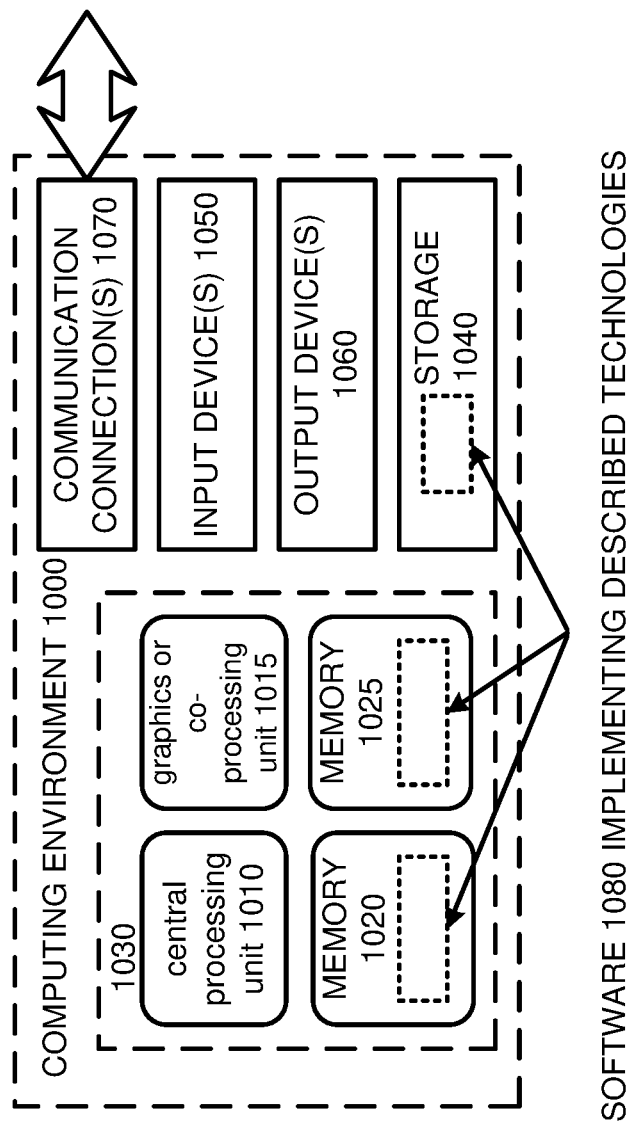
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the technologies described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache. RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 11:
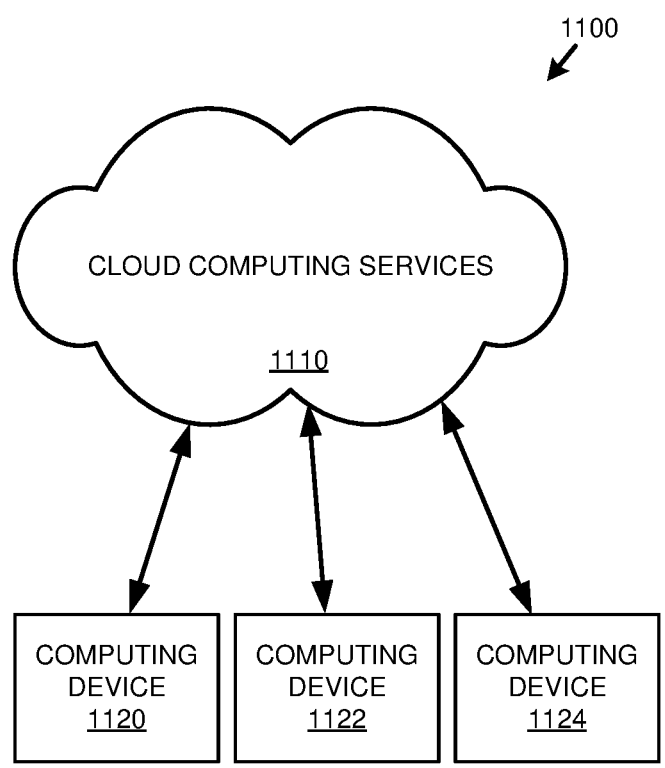
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby. ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   a memory;
   one or more hardware processors coupled to the memory; and
   one or more computer readable storage media storing computer-executable instructions that, when executed, cause the computing system perform operations comprising:
   receiving a first definition of temporal data to be retrieved from a database and a second definition of one or more semantic data elements to be used in processing the temporal data;
   receiving a first change to a first semantic data element of the one or more semantic data elements;
   storing the first change to the first semantic data element, the storing comprising storing a first value of the first semantic data element and information defining a first temporal range for which the first value should be used;
   receiving a query, the query comprising a second temporal range;
   determining that the second temporal range comprises the first temporal range;
   processing the query using the first value; and
   providing query results in response to the receiving the query, the query results comprising aggregated temporal data.

2. The computing system of claim 1, the operations further comprising:
   receiving temporal data; and
   determining the aggregated temporal data using the temporal data and the first value.

3. The computing system of claim 1, wherein the first definition comprises a first indicator of an analog world object, where the temporal data comprises data that is, or is derived from, data received from one or more measurement devices associated with the analog world object.

4. The computing system of claim 3, wherein a set of semantic data element values is stored with the first indicator.

5. The computing system of claim 4, wherein the set of semantic data element values is identified by a second indicator, the operations further comprising:
   receiving temporal data;
   determining an aggregated value of at least a portion of the temporal data, based on the value of the semantic data element, to provide the aggregated temporal data; and
   storing the aggregated temporal data with the first indicator and the second indicator.

6. The computing system of claim 3, wherein the analog world object is an Internet of Things (IOT) device.

7. The computing system of claim 4, wherein the set of semantic data element values is identified by a second indicator and the aggregated temporal data is second aggregated temporal data, the operations further comprising:
   receiving temporal data; and
   determining an aggregated value of at least a portion of the temporal data, based on the first value of the semantic data element, to provide first aggregated temporal data, wherein the second aggregated temporal data is determined at least in part using the first aggregated temporal data; and
   storing the first aggregated temporal data with the first indicator and the second indicator.

8. The computing system of claim 7, the operations further comprising:
   storing a start time and an end time for temporal data used in calculating the first aggregated temporal data with the first aggregated temporal data, the first indicator, and the second indicator.

9. The computing system of claim 1, wherein the second definition is based at least in part on a definition of the query.

10. The computing system of claim 1, wherein the storing the first change comprises storing the first value in a row of a database table, the database table being specified for use with the query.

11. The computing system of claim 1, the operations further comprising:
receiving a second value for the first semantic data element, the second value defined for at least a portion of the first temporal range; and
modifying stored information for the first semantic data element to use the second value for the at least a portion of the first temporal range.

12. The computing system of claim 11, wherein the aggregated temporal data is second aggregated temporal data, the operations further comprising:
receiving temporal data;
determining an aggregated value of at least a portion of the temporal data, based on the first value of the semantic data element, to provide first aggregated temporal data, wherein the second aggregated temporal data is determined at least in part using the first aggregated temporal data; and
calculating third aggregated temporal data to be used in place of the first aggregated temporal data in response to the receiving the second value for the first semantic data element.

13. The computing system of claim 1, wherein the at least a portion of the one or more semantic data elements are used to filter, enrich, or group temporal data in producing the aggregated temporal data.

14. The computing system of claim 1, the operations further comprising:
receiving a definition of the query; and
extracting the at least a portion of the one or more semantic data elements from the definition.

15. The computing system of claim 1, wherein the second definition comprises a first indicator identifying the second definition and the storing the first changes to the first semantic elements comprises storing the first changes as a third definition, the third definition comprising a second indicator identifying the third definition, the second indicator being different than the first indicator.

16. The computing system of claim 15, wherein the second definition comprises a second temporal range for which a second value of the first semantic data element should be used, the second value being different than the first value, and wherein the first temporal range and the second temporal range do not overlap.

17. The computing system of claim 1, wherein the aggregated temporal data is third aggregated temporal data calculated from second aggregated temporal data, the operations further comprising:
receiving temporal data;
determining an aggregated value of at least a portion of the temporal data, based on the first value of the semantic data element, to provide first aggregated temporal data;
receiving an update to the temporal data; and
in response to the receiving the update to the temporal data, calculating second aggregated temporal data to be used in place of the first aggregated temporal data in response to the receiving the second value for the first semantic data element.

18. A method, implemented in a computing system comprising at least one memory and at least one hardware processor coupled to the at least one memory, the method comprising:
receiving a first definition of temporal data to be retrieved from a database and a second definition of one or more semantic data elements to be used in processing the temporal data;
receiving a first change to a first semantic data element of the one or more semantic data elements;
storing the first change to the first semantic data element, the storing comprising storing a first value of the first semantic data element and information defining a first temporal range for which the first value should be used;
receiving a query, the query comprising a second temporal range;
determining that the second temporal range comprises the first temporal range;
processing the query using the first value; and
providing query results in response to the receiving the query, the query results comprising aggregated temporal data.

19. The method of claim 18, wherein the first definition comprises a first indicator of an analog world object, where the temporal data comprises data that is, or is derived from, data received from one or more measurement devices associated with the analog world object.

20. One or more computer-readable storage media comprising:
computer-executable instructions that, when executed by a computing system comprising at least one hardware processor and at least one memory coupled to the at least one hardware processor, cause the computing system to receive a first definition of temporal data to be retrieved from a database and a second definition of one or more semantic data elements to be used in processing the temporal data;
computer executable instructions that, when executed by the computing system, cause the computing system to receive a first change to a first semantic data element of the one or more semantic data elements;
computer executable instructions that, when executed by the computing system, cause the computing system to store the first change to the first semantic data element, the storing comprising storing a first value of the first semantic data element and information defining a first temporal range for which the first value should be used;
computer executable instructions that, when executed by the computing system, cause the computing system to receive a query, the query comprising a second temporal range;
computer executable instructions that, when executed by the computing system, cause the computing system to determine that the second temporal range comprises the first temporal range;
computer executable instructions that, when executed by the computing system, cause the computing system to process the query using the first value; and
computer executable instructions that, when executed by the computing system, cause the computing system to provide query results in response to the receiving the query, the query results comprising aggregated temporal data.

* * * * *